Nov. 22, 1927.

R. F. MAXWELL 1,650,023

LINER PULLER

Filed April 6, 1926

Inventor
Raymond F. Maxwell
By Hazard and Miller
Attorneys

Patented Nov. 22, 1927.

1,650,023

UNITED STATES PATENT OFFICE.

RAYMOND F. MAXWELL, OF LONG BEACH, CALIFORNIA, ASSIGNOR OF ONE-HALF TO CHESTER C. HOSMER, OF HUNTINGTON BEACH, CALIFORNIA.

LINER PULLER.

Application filed April 6, 1926. Serial No. 100,051.

This invention relates to devices for removing pump liners, bushings, valve seats, bearing races and similar ring-like or cylindrical members from the machines or devices in which they are used, the same being herein shown and described as applied to a lining for a pump. When pumps are used for materials containing mud, sand or other gritty or abrading materials, as in oil wells, the wear upon the walls about the pistons is so rapid as speedily to render the pumps unfit for service unless the surfaces of said walls are frequently renewed. This renewal is made possible by the use of liners which fit into the cylinders so tightly as to require considerable effort to remove them, especially after they have had time to rust in position.

It is the object of my invention to improve upon the devices heretofore employed for the purposes stated and to do so in such a way as to produce a puller which, in structure, is simple and rugged; in manufacture is inexpensive, and in operation is speedy and positive.

Figure 1:
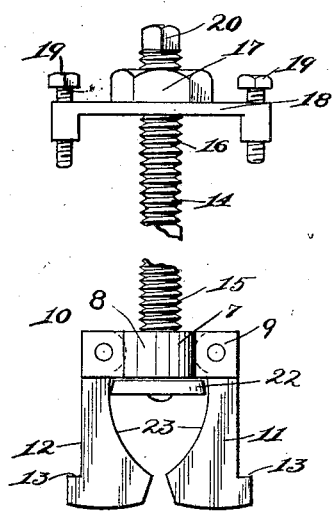
Figures 1, 2 and 3 are, respectively, a side elevation, a longitudinal sectional view and an end elevation of one form of my invention.

Referring to the drawings, 7 is a member in the nature of a spider, the same having a ring-like threaded portion 8 from which project opposite pairs of lugs 9 and 10. Between the lugs 9 there is pivoted the upper end of a grappling dog 11; and a similar but reversely turned dog 12 is pivoted between the lugs 10. At the lower part of their side edges the dogs are provided with outwardly projecting shoulders 13 for a purpose hereinafter stated.

Extending through the member 7 is an operating screw or bolt 14, the same having a threaded portion 15 in engagement with the threads of said member and a threaded portion 16 at or adjacent its outer end. 17 is a nut which screws upon the threads of the portion 16 of the bolt, said nut having a bearing upon a bridge member 18. For purposes hereinafter stated, this member is preferably provided with a pair of adjusting screws 19 on opposite sides of the nut. At its outer end beyond the threaded portion 16 the bolt is formed into a wrench engaging portion 20.

The inner end of the bolt is turned down to form a shouldered bearing 21 for a disc 22, and is then upset or riveted to hold the disc from coming off the bolt, although the disc is permitted to turn freely on its bearing.

The confronting edges of the grappling dogs 11 and 12 are curved inwardly towards each other, as indicated at 23, and the edges are adapted for engagement with the disc 22 as the latter is moved with respect thereto, whereby the dogs may be expanded as desired.

Figure 2:
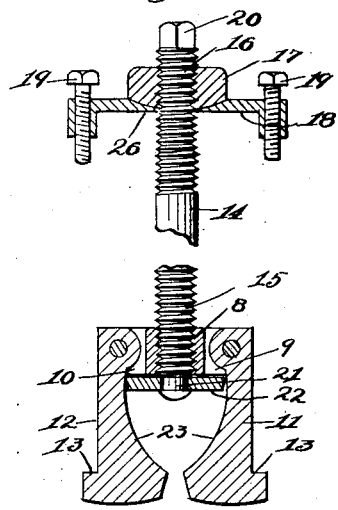
Figure 3:
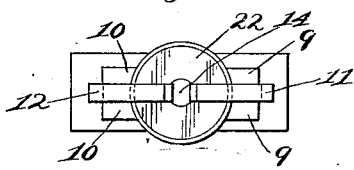
Figure 4:
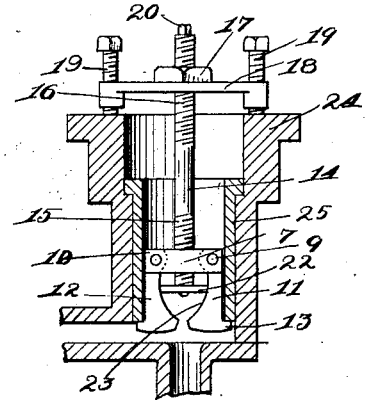
Fig. 4 is a sectional view through a pump cylinder showing the liner therein and the manner in which the puller of Figs. 1 to 3 is employed for removing the liner.

To make clear the operation, reference will now be made to Fig. 4, wherein there is shown a cylinder 24 of a conventional pump or similar device having a liner 25. To apply my invention to this assembly the dogs 11 and 12 must first be collapsed in order that they may be inserted through the liner. This is accomplished by turning the bolt 14 within the member 7, thereby moving the disc 22 into the wide part of the space between the dogs as shown in Figs. 1 and 2.

The puller is now thrust through the liner until the projecting shoulders 13 pass beyond the inner end of the liner. The bolt 14 is then turned in the opposite direction to cause the disc 22 to force the dogs 11 outwardly at their free ends until the shoulders 13 are in position to engage the end of the liner. The bridge member 18 is now brought into position with the bearing screws 19 engaging the end of the cylinder 24 and the nut 17 is screwed down the bolt until it comes to rest against the bridge member 18. The parts are now in position for pulling the liner and this is effected by turning the nut 17 in that direction which causes the bolt 14 to move outwardly, as will be understood. Of course, at this time the engagement of the dogs with the liner will hold the spider member 8 from rotating.

While the nut 17 is supposed to turn upon the threads 16, there is a strong resistance to such turning when the pull becomes heavy and a proportional tendency for the bolt 14 to turn in the spider member 8. This may actually occur for a short increment of travel of the disc 22 along the converging edges of the dogs; but as the expanding movement of the dogs brings the edges at 12 against the walls of the liner, further expansion of the dogs 11 and further rotation of the bolt 14 is prevented. It is one of the advantages of my invention that in its operation, the tenacity of its engagement with the liner being pulled is directly proportional to the pulling stress exerted and there can be no slipping of the dogs on the liner.

Generally the liners pull with comparative ease after they have once been started and broken away from their initial positions and it is practicable to have the bridge member 18 rest directly against the cylinder. Where a longer forced pull is required, it is necessary to space the said member outwardly from the cylinder. This may be done by inserting blocks, wedges or any other suitable devices between the member and cylinder; but preferably it is accomplished by the screws 19 which may be so positioned in the member as to obtain any desired travel of the liner while pulling.

In order to prevent the threads 16 of the bolt from impinging against the bridge member and wearing away, I prefer to depress the member about the bolt hole to form a conical or rounded seat for the nut 17 as indicated at 26 in Fig. 2, and to form the contacting face of the nut to fit this depression. By this simple feature the bolt is centered in the member and the threads are preserved.

It will be noted that the expanding and collapsing movements of the dogs are effected by the same screw 14 which pulls the liner. This is another advantage of my invention. It will be further noted that after the disc 22 engages the dogs in expanding the latter, it turns freely on the end of the bolt and does not turn across the edges of the dogs. This is still another advantage of my invention as it avoids wearing of the disc and dogs.

The term "liner" is used in the following claims in a descriptive and not a limiting sense, it being understood that the invention may be employed for pulling devices other than liners as previously stated.

Having thus described my invention and the manner of its use, what I claim as new is:

1. A liner puller having in combination a gripping element adapted to grip the end and side walls of a liner or the like, a pulling device adapted to withdraw the gripping element and liner, and means slidably engaging the gripping element tending to cause a tighter grip on the side walls of the liner as the tension on the pulling device increases.

2. A liner puller having in combination a plurality of grappling dogs adapted to grip the end and side walls of a liner or the like, a pulling bolt operatively connected to the said dogs, a bridge through which the bolt extends, a nut threaded on the bolt bearing on the bridge, and means actuated by the bolt for slidably engaging the dogs to tighten the grip of same on the side walls of the liner on the rotation of the bolt relative to the gripping dogs and on the rotation of the bolt due to the rotating action of the nut being threaded on the bolt.

3. A liner puller comprising in combination a spider, a plurality of grappling dogs pivotally connected thereto and adapted to grip the end and side walls of a liner or the like, a bolt threaded through the spider, an expanding device forming an operative slidable connection between the bolt and the dogs, adapted to expand the latter on rotation of the bolt, a bridge through which the bolt extends, and a nut on the bolt bearing on the bridge, the rotation of the nut in one direction exerting tension to withdraw the bolt and grip the side walls of the liner and the rotation of the bolt in the direction of rotation of the nut tightening the grip of the dogs on the liner.

4. A liner puller comprising in combination a spider, a plurality of gripping dogs pivotally connected thereto, a bolt threaded through the spider, an expanding device swivelled on the end of the bolt having an operative engagement with the dogs to expand same on rotation of the bolt in one direction, a bridge through which the bolt extends, a nut threaded on the bolt bearing on the bridge, the threads of the bolt allowing the rotation of the nut in one direction to exert a tension on the bolt to withdraw the dogs and grip the liner, the rotation of the nut tending to rotate the bolt, whereby the expanding device expands the dogs to more tightly grip the liner and prevent rotation of said bolt.

5. A liner puller comprising in combination a spider having a plurality of grappling dogs pivotally connected thereto, the said dogs having a curved inner surface, a bolt threaded through the spider having a disc swivelled on one end, the disc being adapted to engage the curved surfaces of the dogs, a bridge through which the bolt extends, and a nut threaded on the bolt bearing on the bridge.

6. A liner puller comprising in combination a spider, a plurality of grappling dogs pivotally mounted thereon, the said dogs having curved inner edges and outer shoulders, the shoulders being adapted to engage a liner, a bolt threaded through the spider, a disc swivelled on the end of the bolt, the disc being adapted to engage the curved surfaces of the dogs, a bridge through which the bolt extends, a nut threaded on the bolt, the bridge having a slightly conical seat adapted to center the nut, the threads on the bolt extending through the nut and through the spider being in the same direction, whereby the tightening of the nut against the bridge in tensioning the bolt may rotate the bolt, the rotation of the bolt forcing the disc into tighter engagement with the grappling dogs.

In testimony whereof I have signed my name to this specification.

RAYMOND F. MAXWELL.